US012478998B2

(12) United States Patent

Scheffers et al.

(10) Patent No.: US 12,478,998 B2

(45) Date of Patent: Nov. 25, 2025

(54) PROTECTION AND INSTALLATION DEVICE FOR FIRE PROTECTION SPRINKLERS

(71) Applicant: Minimax Viking Patent Management GmbH, Bad Oldesloe (DE)

(72) Inventors: Derek John Scheffers, Mattawan, MI (US); Shawn J. Feenstra, Caledonia, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 395 days.

(21) Appl. No.: 17/947,566

(22) Filed: Sep. 19, 2022

(65) Prior Publication Data

US 2023/0090915 A1 Mar. 23, 2023

Related U.S. Application Data

(60) Provisional application No. 63/247,648, filed on Sep. 23, 2021.

(51) Int. Cl.

*B05B 15/16* (2018.01)
*A62C 35/68* (2006.01)

(52) U.S. Cl.

CPC .............. *B05B 15/16* (2018.02); *A62C 35/68* (2013.01)

(58) Field of Classification Search

CPC ......... A62C 31/28; A62C 31/02; A62C 37/12; A62C 35/68; A62C 37/11; A62C 37/08; A62C 35/58; B05B 15/16; B05B 1/262

USPC ...................................................... 169/37, 56

See application file for complete search history.

(56) References Cited

U.S. PATENT DOCUMENTS

| | | | | |
|---|---|---|---|---|
| 4,176,756 | A | 12/1979 | Gellman | |
| 6,098,256 | A | 8/2000 | Poussard | |
| 6,487,942 | B1 | 12/2002 | Carter et al. | |
| 6,669,111 | B2 | 12/2003 | Vinson et al. | |
| 7,055,614 | B1 | 6/2006 | Ide | |
| 7,185,567 | B2 | 3/2007 | Ide | |
| 7,273,189 | B2 | 9/2007 | Ide et al. | |
| 7,540,330 | B2 | 6/2009 | Orr et al. | |
| 7,757,967 | B1 * | 7/2010 | Yang ...................... | A62C 37/08 169/37 |
| 7,891,716 | B2 | 2/2011 | Orr et al. | |
| 7,900,852 | B2 | 3/2011 | Feenstra | |

(Continued)

FOREIGN PATENT DOCUMENTS

| | | |
|---|---|---|
| GB | 126753 | 5/2019 |

*Primary Examiner* — Arthur O. Hall

*Assistant Examiner* — Juan C Barrera

(74) *Attorney, Agent, or Firm* — Perkins Coie LLP

(57) ABSTRACT

A method and device for protecting and installing a fire protection sprinkler assembly having a thermally responsive trigger. The method includes shielding and torqueing a fire protection sprinkler with a protective device having a torque assist portion. The protective device includes a first and second member strapped about the sprinkler assembly. Each of the members of the protective device has a first lateral end and a second lateral end disposed about the thermally responsive trigger. At least one of members has a concave segment and a convex segment formed between the first lateral end and the second lateral end. The convex and concave segments define therebetween an external torque assist surface of the protective device that can be used to manually torque and install the sprinkler assembly.

21 Claims, 8 Drawing Sheets

(56) References Cited

U.S. PATENT DOCUMENTS

| | | | | |
|---|---|---|---|---|
| 8,297,663 | B2 | 10/2012 | Spears | |
| 8,469,111 | B2 | 6/2013 | Orr et al. | |
| 8,662,191 | B2 | 3/2014 | Orr et al. | |
| 8,905,151 | B2 | 12/2014 | Silva, Jr. et al. | |
| 9,027,660 | B2 | 5/2015 | Oldham | |
| 9,320,929 | B2 | 4/2016 | Koiwa | |
| 9,463,343 | B2 | 10/2016 | Koiwa | |
| 9,630,039 | B2 | 4/2017 | Koiwa | |
| 10,376,724 | B2 | 8/2019 | Macomber | |
| 10,737,371 | B2 | 8/2020 | Watson et al. | |
| 10,744,527 | B2 | 8/2020 | Jackson | |
| 10,940,348 | B2 | 3/2021 | Oldham et al. | |
| 10,940,349 | B2 | 3/2021 | Schnell et al. | |
| 11,160,999 | B2 | 11/2021 | Koiwa | |
| 11,872,425 | B2 | 1/2024 | Feenstra et al. | |
| 12,157,022 | B2 | 12/2024 | Watson et al. | |
| 12,257,465 | B2 | 3/2025 | Feenstra et al. | |
| 2007/0256844 | A1 | 11/2007 | Blasing et al. | |
| 2010/0059235 | A1* | 3/2010 | Feenstra ................ | A62C 37/12 169/42 |
| 2017/0326393 | A1* | 11/2017 | Oldham ................. | A62C 35/68 |
| 2019/0143163 | A1* | 5/2019 | Schnell .................. | A62C 31/28 169/37 |
| 2019/0175968 | A1 | 6/2019 | Pressnell | |
| 2022/0203395 | A1 | 6/2022 | Pleyte et al. | |
| 2023/0087195 | A1 | 3/2023 | Workman et al. | |
| 2023/0088036 | A1 | 3/2023 | Feenstra et al. | |
| 2023/0089748 | A1 | 3/2023 | Watson et al. | |
| 2023/0100701 | A1 | 3/2023 | Feenstra et al. | |
| 2023/0101096 | A1 | 3/2023 | Watson et al. | |

* cited by examiner

PROTECTION AND INSTALLATION DEVICE FOR FIRE PROTECTION SPRINKLERS

PRIORITY DATA & INCORPORATION BY REFERENCE

This application claims the benefit of priority to U.S. Provisional Patent Application No. 63/247,648, filed on Sep. 23, 2021, which is incorporated by reference in its entirety.

TECHNICAL FIELD

The present invention relates generally to protection devices and installation tools for fire protection sprinklers and systems. In particular, the present invention relates to a protective cover and installation device for fire protection sprinklers.

BACKGROUND ART

Fire protection sprinklers include a sprinkler frame body with an inlet connected to a pressurized supply of firefighting fluid, such as water, and some type of fluid deflection member spaced from an outlet of the frame body to distribute firefighting fluid discharged from the outlet in a defined spray distribution pattern over an area to be protected. In some fire protection sprinklers, the release of fluid discharge from the sprinkler body is controlled. For example, automatic fire protection sprinklers include a fusible or thermally responsive trigger assembly which secures a seal over an internal central orifice formed proximate the outlet of the frame body. When the temperature surrounding the automatic sprinkler is elevated to a pre-selected value indicative of a fire, the trigger assembly operates, fractures or collapses to release the seal assembly and fluid flow is initiated through the sprinkler body and out the outlet to impact the fluid deflection member. In other types of controlled sprinklers, the trigger and/or seal is operated or otherwise ejected by a mechanical, electrical or computer-controlled actuator.

The response and actuation of the sprinkler is based upon the thermally responsive trigger or actuator; and the spray pattern or distribution of the firefighting fluid is defined by the fluid deflection member configuration. Accordingly, proper sprinkler performance is a function of these operative components. In order to maintain the expected performance of the sprinkler, there is a need to protect the automatic fire protection sprinkler from unintended impact and/or damage. Known fire protection covers are shown and described in U.S. Pat. Nos. 6,669,111; 7,540,330; 7,757,967; and 7,900,852. Generally, these known protective devices are either axially disposed over the sprinkler to protect the fluid deflection member and the thermally responsive trigger. Alternatively, the protective device is strapped about the sprinkler frame between the frame body and the fluid protection member to protect the thermally responsive trigger. These known protective sprinkler covers are made from plastic and are affixed about the sprinkler to protect the sprinkler during storage, transport, handling and/or during the installation process. Once the sprinkler is properly installed in the branch connector, the protective device can be removed to place the sprinkler into service.

Fire protection sprinklers are used, for example, in the protection of storage commodities and occupancies. Storage fire protection systems include a network of pipes connected to a firefighting fluid supply and installed above the storage commodity beneath the ceiling of the occupancy. The piping network includes one or more branch lines coupled to a cross-main which is connected to a fluid supply by a vertical piping riser to supply the branch line(s) with the firefighting fluid. Fire protection sprinklers are connected to the branch lines in an appropriate orientation and at an appropriate sprinkler-to-sprinkler spacing.

To connect the fire protection sprinklers to the branch lines, the branch lines are configured as linear pipe headers with branch connectors extending from the header for receipt and threaded connection of a fire protection sprinkler. Known connectors have one inlet end configured for welded connection to the pipe header and an opposite outlet end with a tapered threaded end for connection of a sprinkler. In order to form a fluid tight seal between the threadedly engaged connector and the sprinkler, a sealing tape or putty is be applied to the sprinkler. In order to form a fluid tight seal between the cooperating tapered threads, the sprinkler must be properly torqued using a wrench.

There are also known branch connectors which eliminate either or both of the tapered thread connection or the need to apply a sealing tape or putty. For example, each of U.S. Pat. Nos. 8,297,663 and 10,744,527 and U.S. Patent Publication No. 2019/0175968 show and describe connectors or adapters for connecting a fire protection sprinkler to a pipe header. Each of these known connectors use an internal straight thread at the outlet to connect the tapered thread of the fire protection sprinkler, which allows the sprinkler to be placed in a desired rotational orientation without the interference of the thread engagement. To form a fluid tight seal between the connector and the sprinkler, each of the connectors employ an internal annular seal member. The sprinkler is then threaded into the connector and sufficiently torqued to form the fluid tight connection.

In order to maintain protection of the sprinkler during the installation process it is preferred to keep a protective device on the sprinkler. This can create a problem for properly torqueing the sprinkler to form a fluid tight seal. The presence of a known protective device on the sprinkler frame can interfere or prevent proper wrench engagement. Moreover, it is problematic trying to use the known protective device to directly torque the sprinkler because these known protective devices are not configured to sufficiently grasp the sprinkler frame and transfer a torque sufficient to form a fluid tight sealed connection. Accordingly, there is a need for sprinkler protective devices that can protect operative components of the sprinkler during storage, transport handling and installation and also sufficiently transfer a torque to form a fluid tight sealed connection between a sprinkler and a branch connector.

DISCLOSURE OF THE INVENTION

Preferred embodiments of a method of protecting and installing an automatic fire protection sprinkler assembly having a preferred frame with a body and a pair of spaced apart frame arms in a plane and extending from the body with a fluid deflection member coupled to the frame arms and spaced from the body with a thermally responsive trigger assembly coaxially disposed between the body and the fluid deflection member. The preferred method includes shielding the thermally responsive trigger with a concave segment of a protective member relative to the central sprinkler axis and torqueing the sprinkler assembly into a branch connector with a convex segment of the protective member relative to the central sprinkler axis that is preferably located between one frame arm and the trigger. Preferably, the torqueing is performed by hand and is sufficient to form a fluid tight seal between the sprinkler and the branch connector. Preferred embodiments of the method include confronting the one frame arm with a planar segment of the protective member that extends parallel to the plane.

Preferred embodiments of a protected fire protection sprinkler assembly are also provided. One preferred embodiment of a protected fire protection sprinkler assembly includes a fire protection sprinkler including a body having an inlet, an outlet, an internal passageway extending between the inlet and the outlet along a central sprinkler axis, and an external thread formed about the central sprinkler axis. The fire protection sprinkler includes a pair of frame arms extending axially from the body and converging toward one another to preferably form an apex centered along the central sprinkler axis and spaced axially from the outlet. The fire sprinkler includes a fluid deflection member preferably affixed to the apex and centered along the central sprinkler axis with the apex between the thermally responsive trigger assembly and the fluid deflection member. The preferred assembly includes a protection and installation device strapped about the fire protection sprinkler. The protective device preferably includes a first protective member and a second protective member opposed one another about the plane to at least partially surround the thermally responsive trigger assembly. At least one of the first and second protective members preferably includes, with respect to the thermally responsive trigger assembly, a concave segment and a convex segment that are preferably contiguous with one another. An inflection transition is preferably formed between the concave segment and the convex segment to define an external torque assist surface of the protective device. Preferably, each of the first member and second member have a first protection portion for protection of the thermally responsive trigger assembly and a second protection portion axially spaced from the first portion for protection of the fluid deflection member.

Preferred embodiments of a protective device provide a preferred protective installation device for a fire protection sprinkler. The preferred protective device includes a first member and a second member opposed and connected to one another about a plane to at least partially circumscribe a central axis and define an internal void for housing the fire protection sprinkler. The first and second members define a first portion of the protective device having a first width for protecting the thermally responsive trigger and the first and second members define a second portion of the protective device having a second width greater than the first width for protecting the fluid deflection member. Each of the first member and the second member having a first end portion and a second end portion disposed laterally about the internal void. At least one of the first member and the second members has a convex segment with respect to the internal void to define an external torque assist surface of the protective device. The external torque assist portion defines a preferred finger rest region or thumb drive for grasping the protection device and drawing the first and second member toward one another to grip and applying a torque to a sprinkler housed in the internal void.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1A:
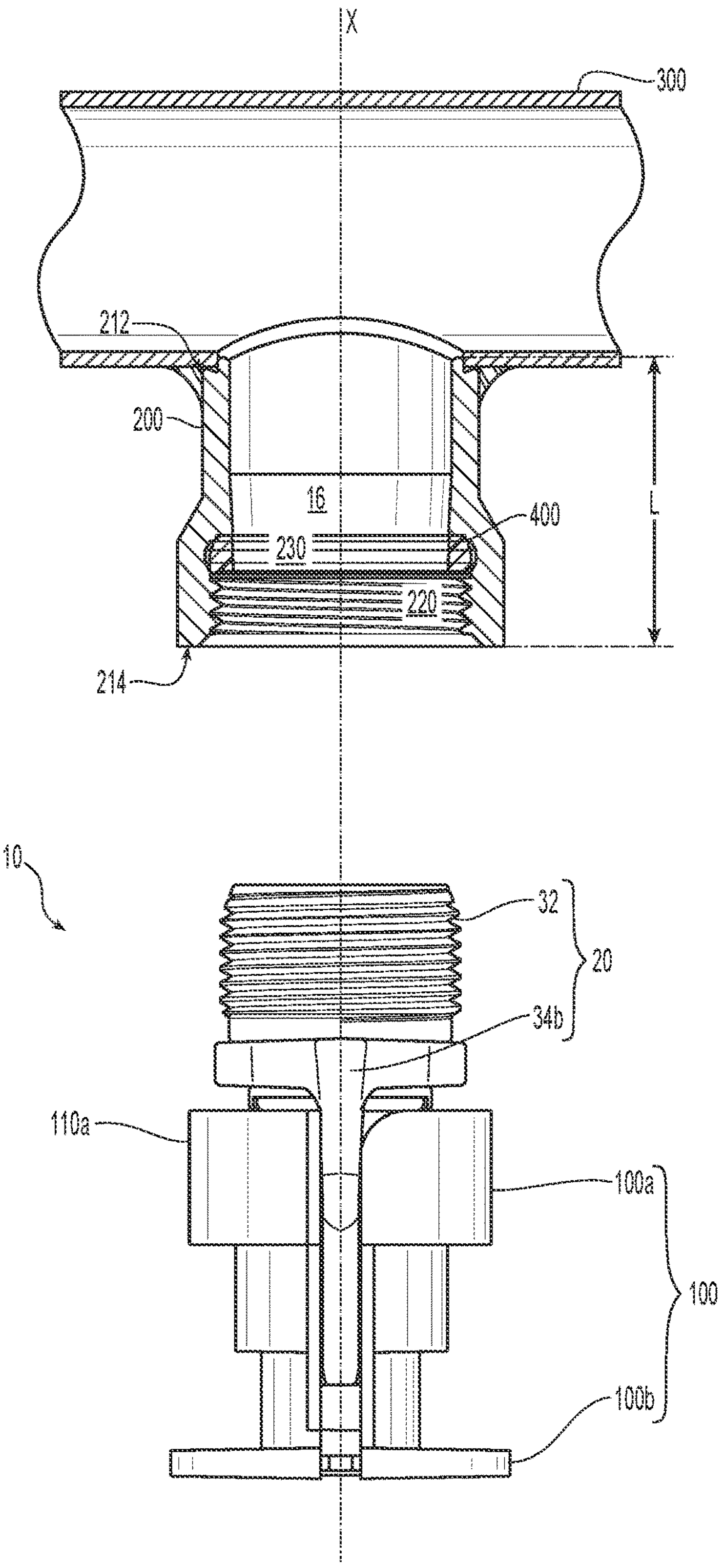
FIG. 1A is a partial cross-sectional exploded view of a preferred embodiment of a protected sprinkler assembly coupled to a branch connector.
Figure 4:
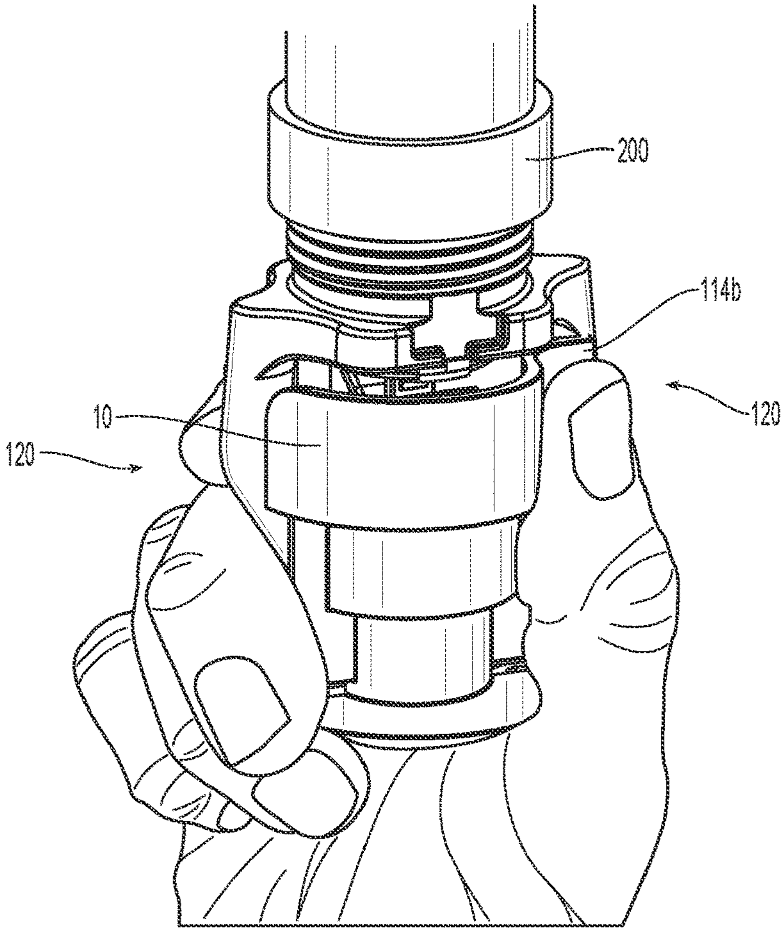
FIG. 4 is an illustration of the preferred protected sprinkler assembly in FIG. 1A being installed by hand.

Shown in FIG. 1A is an exploded partial cross-sectional view of a preferred protected sprinkler assembly 10 having a fire protection sprinkler 20 and a protective device 100 for installation in a branch connector 200 of a fluid supply pipe header 300. Preferred embodiments of the protective device 100 protects the sprinkler 20 from unintentional impact and damage during storage, transport, installation and/or when awaiting to be placed into service. Moreover, the protective device 100 also serves as a tool for installing the sprinkler 20 into the branch connector 200 of a fire protection sprinkler system. More specifically, the preferred device 100 facilitates installation of the sprinkler 20 by hand torqueing the protected assembly into the branch connector 200 as illustrated in FIG. 4.

Figure 1B:
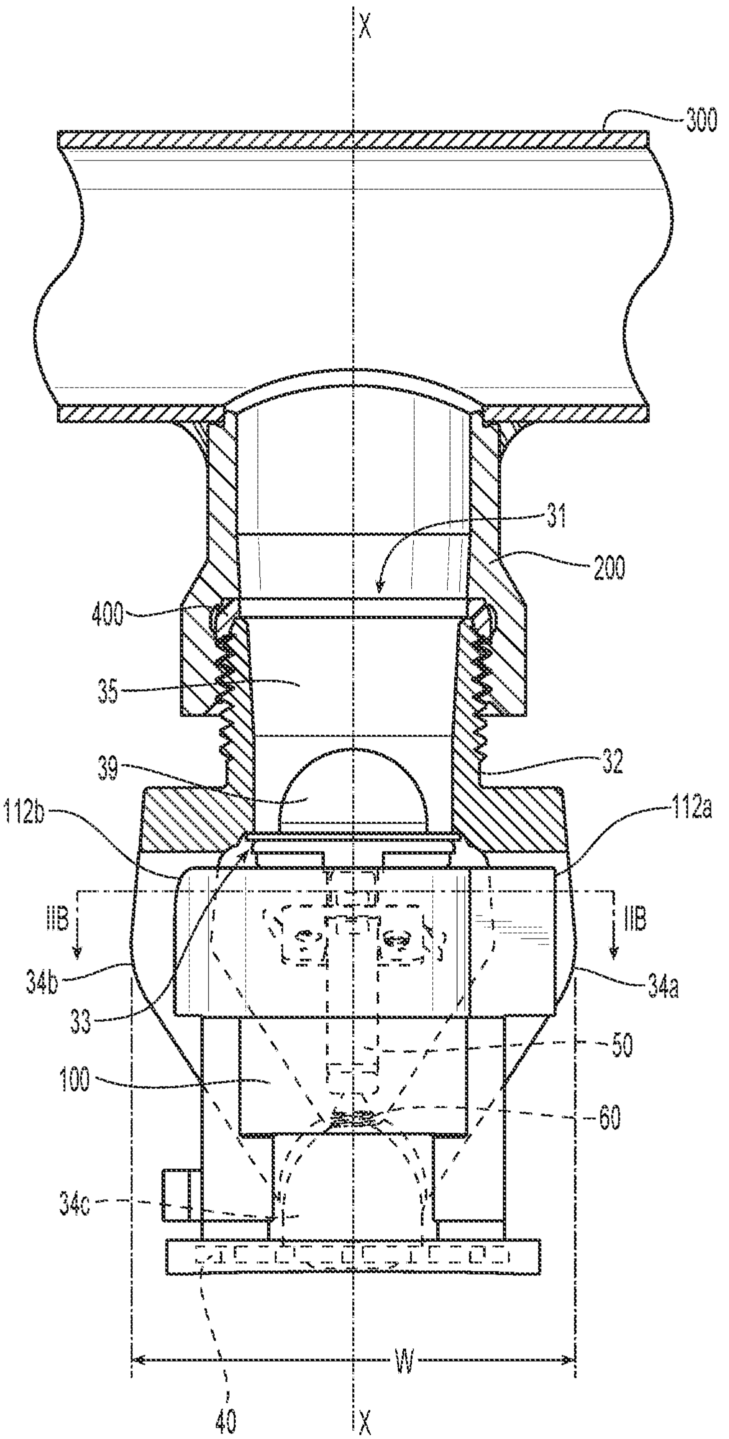
FIG. 1B is a partial cross-sectional phantom view of the protected sprinkler assembly of FIG. 1A.
Figure 2A:
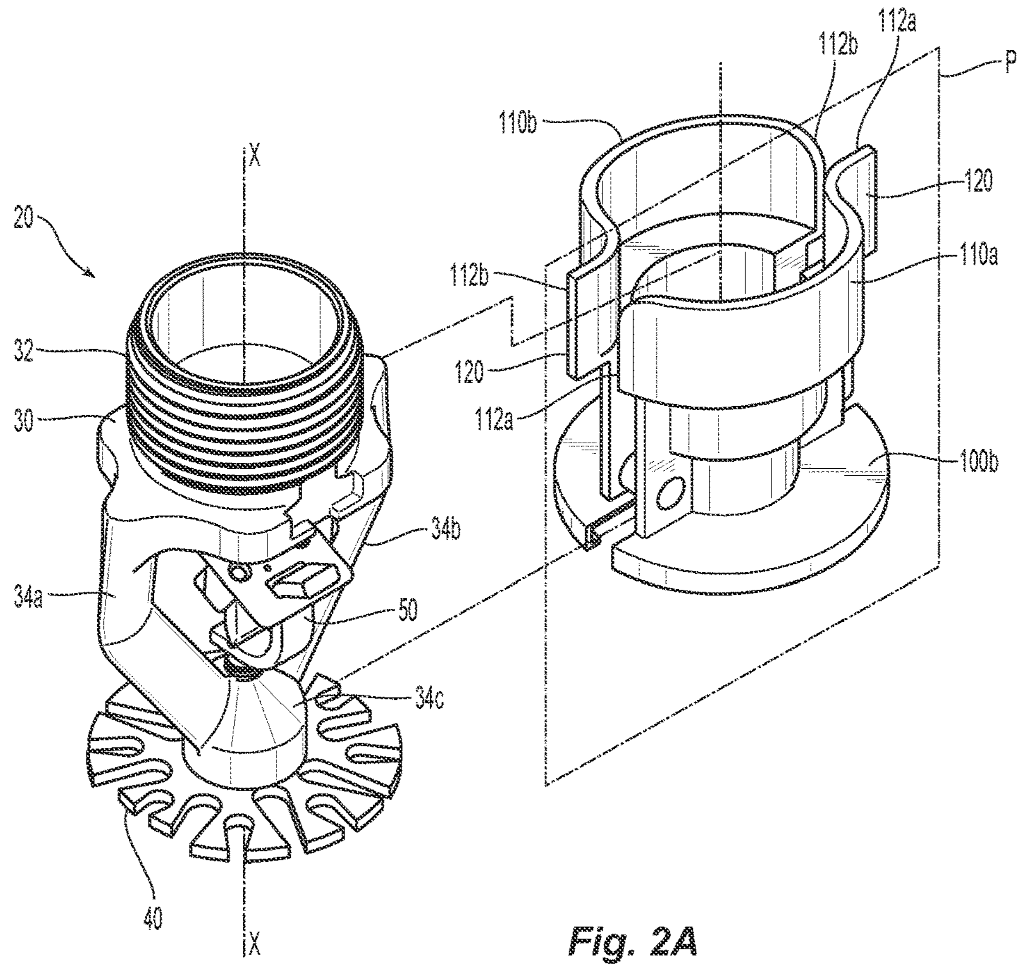
FIG. 2A is an exploded view of a preferred embodiment of the protected sprinkler assembly of FIG. 1A.

With reference to FIGS. 1A-1B and 2A, in preferred embodiments of the protected sprinkler assembly and its installation, the sprinkler 20 generally includes a frame 30 with a body 32 and a pair of spaced apart frame arms **34*a*, 34*b* extending from and preferably diametrically disposed about the body 32. The frame arms 34*a*, 34*b* are preferably aligned with one another in plane P. A fluid deflection member 40 is coupled to the frame arms 34*a*, 34*b* and axially spaced from the body 32. The fluid deflection member 40 and the sprinkler 20 can be configured for installation as a pendent sprinkler, as shown, a horizontal sprinkler or an upright sprinkler, as illustratively shown in FIGS. 5A-5C. The sprinkler body 32 has a fluid inlet 31, a fluid outlet 33, defining an internal passageway 35 extending between the inlet 31 and the outlet 33 along a central sprinkler axis X-X. The body is configured for installation in the branch connector 200; and in preferred embodiments of the sprinkler 20, the body 32 includes an external thread formed about the central sprinkler axis X-X for a preferably threaded connection to the branch connector 200**.

The sprinkler 20 is preferably an automatic sprinkler with a thermally responsive trigger assembly 50 coaxially disposed between the body 32 and the fluid deflection member 40. The trigger 50 can be embodied as a frangible glass bulb or alternatively, a solder link with strut and lever assembly. The automatic fire protection sprinkler includes an internal seal assembly 39 that is supported in place by the thermally responsive trigger assembly 50 to maintain a fluid tight seal. In preferred embodiments of the sprinkler 20, the fluid deflection member 40 is affixed to an apex 34*c* coaxially aligned the central axis X-X. Alternatively, or additionally, the trigger assembly 50 and/or seal assembly 39 can incorporate an actuator for a controlled discharge. In the preferred frame 30, the frame arms 34*a*, 34*b* preferably converge to form the preferred apex 34*c*. The thermally responsive trigger assembly 50 is preferably axially supported by a threaded load screw or member 60 threaded into the apex 34*c*. Accordingly, the apex 34*c* is preferably located between the thermally responsive trigger assembly 50 and the fluid deflection member 40.

The sprinkler 20 is installed and connected to the branch connector 200 by the device 100. The protective device 100 is subsequently removed and the sprinkler 20 is placed into service. The trigger assembly 50 is configured to thermally actuate in response to a fire or sufficient level of heat. Upon thermal actuation, the seal assembly 39 is released and ejected from the outlet 33 preferably under fluid pressure delivered to the inlet 31 from the header 300 and through the branch connector 200. The firefighting fluid is discharged from the open outlet 33 for distribution by the fluid deflection member 40 to address the fire event.

Shown in FIGS. 1A-1B and 2A-2C are various views of the protected sprinkler assembly 10. In the preferred sprinkler assembly 10, the protective and installation device 100 is disposed about the fire protection sprinkler frame 30 so as to at least partially circumscribe and protect the thermally responsive trigger 50 and even more preferably partially circumscribe and protect the fluid deflection member 40. In preferred embodiments described herein, the protective device 100 includes a first portion 100*a* for protecting the thermally responsive trigger 50 and preferably a second portion 100*b* axially spaced from the first portion for protecting the fluid deflection member 40. Preferred embodiments of the protective installation device 100 includes a torque assist features that facilitates transfer of a torque, and more preferably a hand torque, to the sprinkler 20 by minimizing or eliminating rotational slip or relative rotation between the sprinkler 20 and the device 100. Moreover, the protective device 100 includes external contact points or surfaces that facilitate grip of the device 100 to protect the sprinkler 20 and/or the user or handler.

The preferred protection and installation device 100 is preferably strapped about the sprinkler 20 so as to locate and house operative components of the sprinkler 20 within the internal protective space or void of the device 100. The protective device 100 preferably includes a first member 110*a* and a second member 110*b* opposed one another about a plane P to define the preferred internal void about a central axis. Overall, each of the first and second members 110*a*, 110*b* define a geometric profile that facilitates sprinkler protection and handling of the assembly 10. In preferred embodiments of the device 100, at least one of the first and second members 110*a*, 110*b* defines a shielding segment and a convex segment, with respect to the internal void of the device, having a transition therebetween to define a preferred external torque assist surface of the device. The first and second members define a first width or space therebetween to form the first portion 100*a* of the device for protecting the thermally responsive trigger 50. The first and second members 110*a*, 110*b* also preferably define a second width therebetween that is greater than the first width to form the second portion 100*b* of the device 100 for protecting the fluid deflection member 40.

The members 110*a*, 110*b* are either integrally formed or joined as protective members for peripherally surrounding and preferably at least partially circumscribing each of the thermally responsive trigger 50 and the fluid deflection member 40 with the pair of frame arms 34*a*, 34*b* preferably disposed in the plane P. The members 110*a*, 110*b* are preferably formed from a polymer or plastic material such as, for example, polyethylene and formed by molding such as, for example, injection molding. Each of the preferably opposed members 110*a*, 110*b* has a first lateral end 112*a* and a second lateral end 112*b* disposed laterally about the internal void of the device 100 or the sprinkler 20 housed therein. At least one, and preferably both, of the protective members 110*a*, 110*b* includes a shielding portion, preferably in the form of a concave segment 114*a*, and a convex segment 114*b*, each defined with respect to the central sprinkler axis X-X, the internal volume of the protective device 100 or the thermally responsive trigger assembly 50 contained therein. The concave segment 114*a* is formed to partially circumscribe and shield the thermally responsive trigger assembly 50. In preferred embodiments, the concave segment 114*a* defines a variable radius about the central axis X-X. The shielding portion of the members 110*a*, 110*b* can be defined by alternate geometries about the axis X-X provided the geometry can at least partially surround and shield the trigger assembly 50.

The concave and convex segments 114*a*, 114*b* are formed between the first lateral end 112*a* and the second lateral end 112*b* of the protective member 110. Preferably, the convex and concave segments 114*a*, 114*b* are contiguous with one another to define a preferred inflection transition 115 of the protective member 110. For the preferred protective device 100, the transition 115 provides a torque assist portion 120 that more preferably includes or defines an external torque assist surface of the protective device 100 that can be used for applying a torque to the protected assembly 10 to facilitate installation of the sprinkler 20 into the branch connector 200 or other fitting. The convex segment 114*b* defines a preferred finger rest or thumb drive against which a hand torque can be applied as illustrated in FIG. 4. Additionally, or alternatively, the external surface of the convex 114*b* segment can include other surface features to accommodate and define the preferred finger or thumb rest. In the preferred sprinkler assembly 10, the convex segment 114*b* is preferably laterally located between the thermally responsive trigger assembly 50 and one frame arm to define the preferred external torque assist surface. Accordingly, the protective device 100 provides a preferred method for protecting and installing a fire protection assembly 10 that includes shielding the thermally responsive trigger with a concave segment 114*a* of a protective member 110 relative to the central sprinkler axis X-X; and torqueing the sprinkler assembly 10 into a branch connector 200 with a convex segment 114*b* of the protective member 110 relative to the central sprinkler axis X-X and located between one frame arm 34 and the trigger assembly 50.

To transfer a torque applied to the device 100 to the sprinkler 20, one and preferably both of the protective members 110*a*, 110*b* includes another segment 114*c* at one or both of the lateral ends 112*a*, 112*b* that confronts one of the frame arms 34*a*, 34*b*. In preferred embodiments of the device 100, one and preferably both of the protective members 110*a*, 110*b* includes a planar segment 114*c* that confronts one of the frame arms 34*a*, 34*b*. More preferably, the planar segment 114*c* preferably extends parallel to the plane P and is preferably configured contiguously with the concave and convex segments 114*a*, 114*b* so that the convex portion 114*b* is located between the concave segment 114*a* and the planar segment 114*c*. Accordingly, the planar segment 114*a* further defines the preferred external torque assist portion 120 with the convex segment 114*b* and the preferred inflection transition 115.

The protective device 100 is located axially to extend from the frame body 32 to the fluid deflection member 40. Moreover, the torque assist portion 120 is located axially between the body and the fluid deflection member 40. More preferably, the torque assist portion 120 is located axially between the fluid outlet 33 and the apex 34*c*; and even more preferably, the torque assist portion 120 is located axially closer to the outlet 33 than to the apex 34*c*. Additionally, the protective device 100 is disposed about the frame 30 to expose the wrench boss of the sprinkler frame for use of the protective device 100 in combination with a wrench to install the sprinkler. The protective device extends axially to the fluid deflection member 40 and more preferably is configured to house the fluid deflection member 40 and more preferably peripherally surrounds the fluid deflection member 40.

Figure 2B:
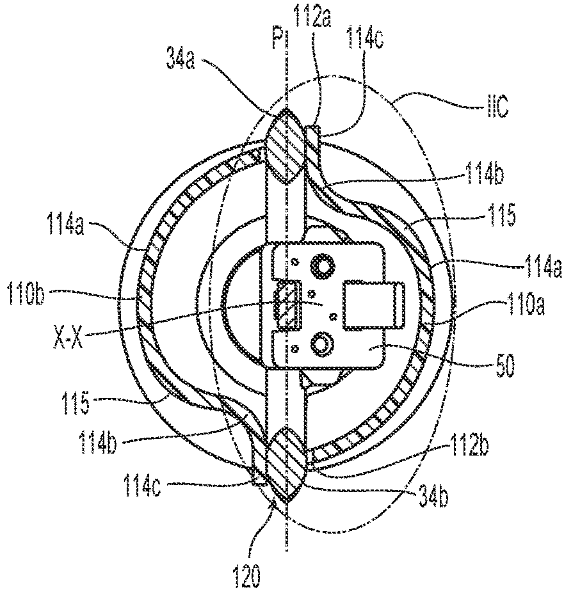
FIG. 2B is a cross-sectional plan view of the protected sprinkler assembly of FIG. 1A.
Figure 3A:
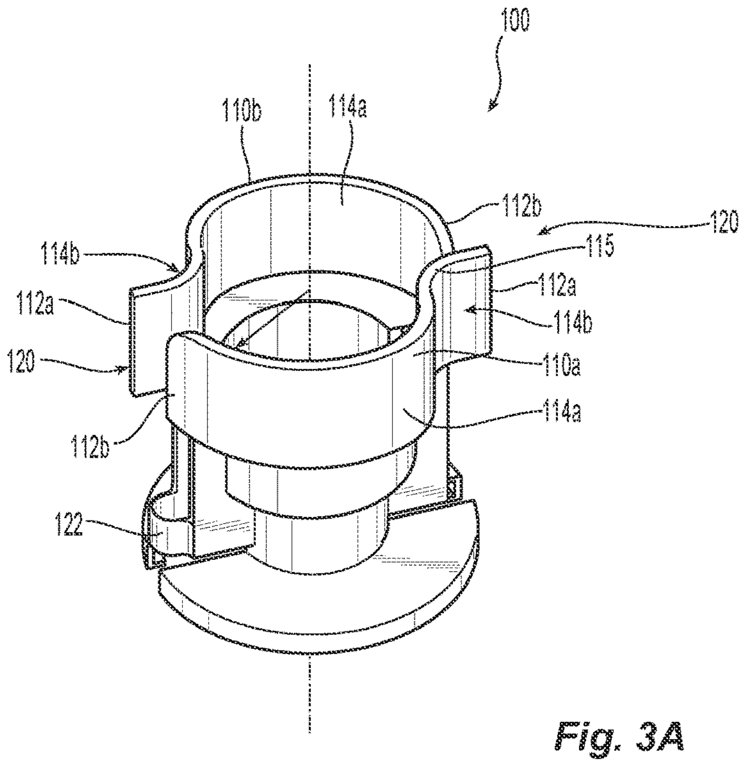
FIGS. 3A-3B are perspective views of the protective device used in the protected sprinkler assembly in FIG. 1A.
Figure 3B:
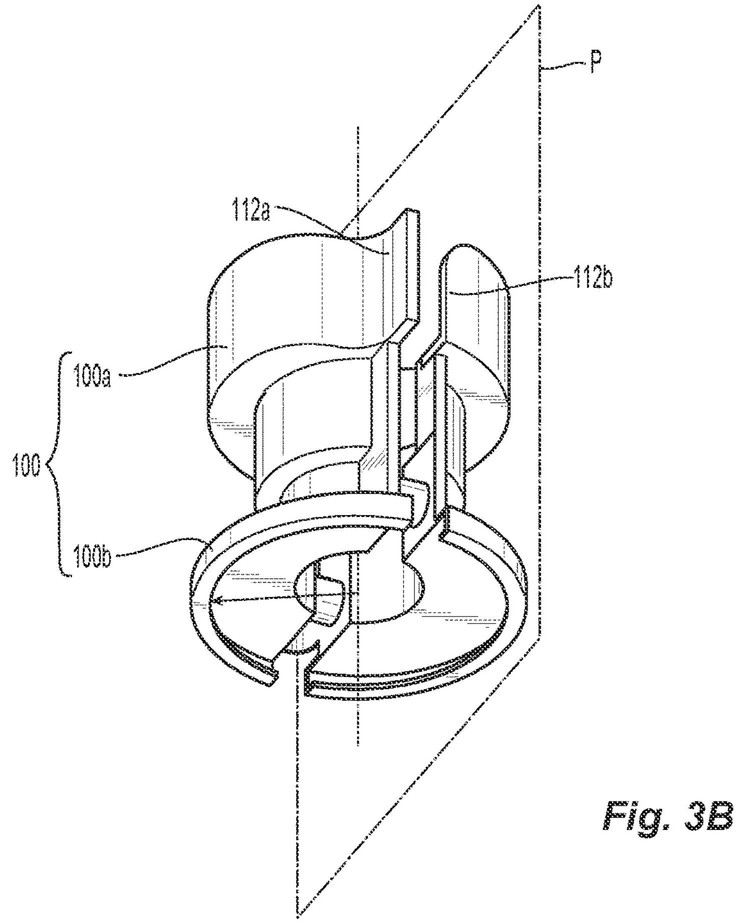

In preferred embodiments of the device 100, each of the first and second members 110*a*, 110*b* include defines a first maximum radius from the central sprinkler axis for protecting the thermally responsive trigger 50 assembly and a second protective portion defining a second maximum radius from the central sprinkler axis for protecting the fluid deflection member 40 in which the second maximum radius is greater than the first radius. As seen in FIGS. 1A and 3A, the concave segment 114*a* defines the preferred first maximum radius and the first protection portion 100*a* of the device 100 preferably narrows in the axial direction toward the second protection portion 100*b*. The first portion 100*a* can narrow uniformly or more preferably narrow in a step-wise fashion as shown. With reference to FIGS. 2B and 3A-3C, the second protection portion 100*b* of the device preferably includes a radially extending shielding surface disposed normal or perpendicular to the central longitudinal axis X-X to protect a surface of the fluid deflection member 40 opposed to the outlet 33 and a peripheral shielding surface that at least partially circumscribes the fluid deflection member 40. In the preferred embodiment shown in FIG. 3B, the second protection portion 100*b* can include a second radially extending parallel to the first radially extending surface and normal to the central axis X-X to form a preferred lower surface or lip for shielding the fluid deflection member with the peripheral surface extending between the first and second radially extending surfaces.

Figure 3C:
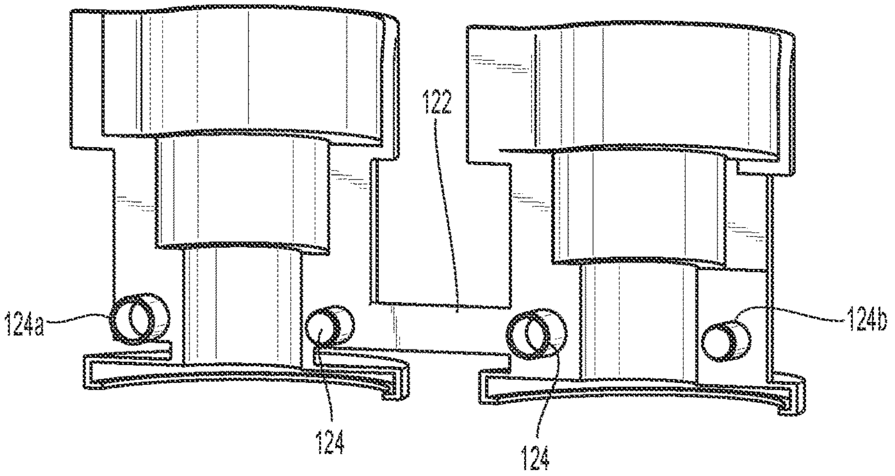
FIG. 3C is another perspective view of the protective device in FIG. 3A in an open configuration.

The opposed members 110*a*, 110*b* are preferably coupled to one another about the fire protection sprinkler 20. In one preferred aspect, the protective device 100 includes a hinge portion 122, as seen in FIG. 3A, formed to connect protective member 110*a*, 110*b* to one another. The hinge portion 122 allows the members 110*a*, 110*b* to pivot with respect to one another to define an open configuration for disposing or strapping the protective device 100 about the sprinkler 20 and define a closed configuration for affixing the protective device 100 about the sprinkler 20. With reference to FIG. 3C and the view of the protective device 100 in an open configuration, the interior alternatively or additionally includes one, and preferably more than one spacer 124 between the first and second members 110*a*, 110*b*. In the preferred embodiment, a pair of spacers 124 are disposed radially about each side of the apex 34*c* between the members 110*a*, 110*b*. Additionally, one or both of the preferred members 110*a*, 110*b* include other internal formations that extend toward and preferably perpendicular to the plane P in the closed configuration of the device 100 to surround and/or contact the trigger 50. The formations preferably stabilize the protective device 100 about the frame 30 and more preferably center the trigger 50 within the device 100. The spacers 124 are preferably located radially inward with respect to the end portions 112*a*, 112*b*. Moreover, one or both of the spacers can form a latched connection with the spacer 124 including a cylindrical insert 124*a* that engages a complementary cylindrical receiver 124*b* to connect the members 110*a*, 110*b* to one another in the closed configuration of the device 100.

In the closed configuration of the device 100, the spacers 124 extend perpendicularly to the plane P between the members 110*a*, 110*b* to space the members 110*a*, 110*b* apart from one another. In the preferred protected sprinkler assembly 10, the first and second members 110*a*, 110*b* are spaced apart from one another about the plane P and more particularly the opposed lateral end portions 112*a*, 112*b* are spaced apart about the plane P for gripping the frame arms 34*a*, 34*b* therein as seen in FIG. 2B. More particularly in the preferred assembly 10, the first lateral end 112*a* of the first member 110*a* and the second lateral end 112*b* of the second member 110*b* are positioned opposite one another about the plane P with one frame arm 34*a* disposed therebetween with the second lateral end 112*b* of the first member 110*a* and the first lateral end 112*a* of the second member 110*b* are positioned opposite one another about the plane P with the other frame arm 34*b* disposed therebetween for gripping and confronting by the preferred diametrically opposed planar confronting segments 114*c*. As seen in FIG. 2B, the protective device 100, in its closed configuration, is preferably asymmetrical about the plane P. In preferred embodiments of the protective device 100, the device can be grasped by hand and the two members 110*a*, 110*b* can be drawn toward one another to grip the sprinkler 20.

Figure 2C:
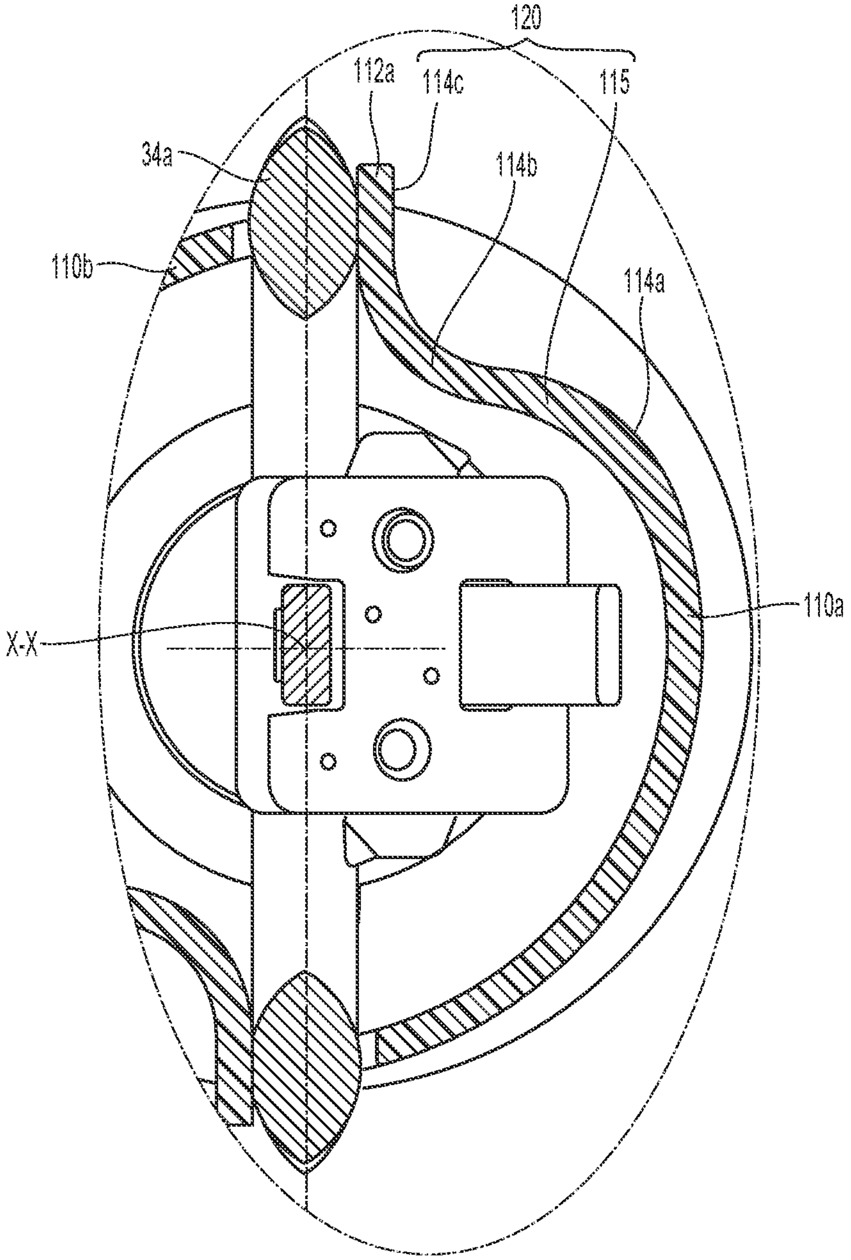
FIG. 2C is a detailed view of FIG. 2B along portion IIC.
Figure 5A:
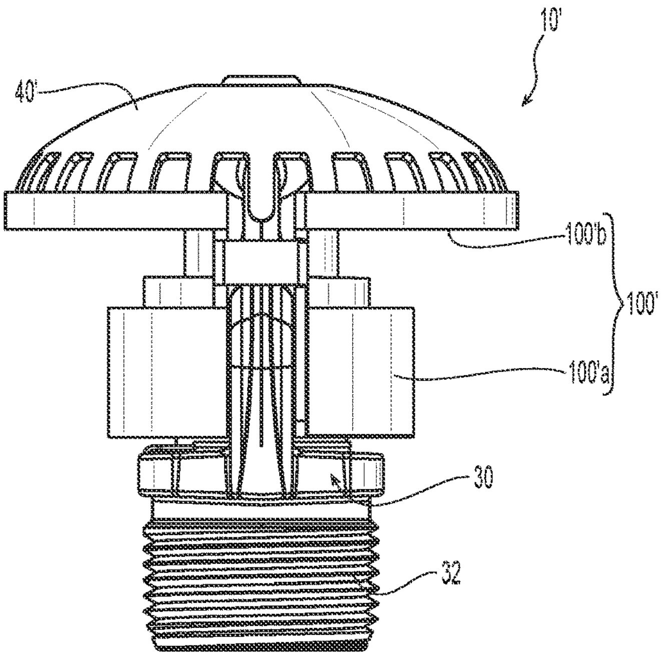
FIGS. 5A-5C are various views of another preferred embodiments of a protected sprinkler assembly.
Figure 5B:
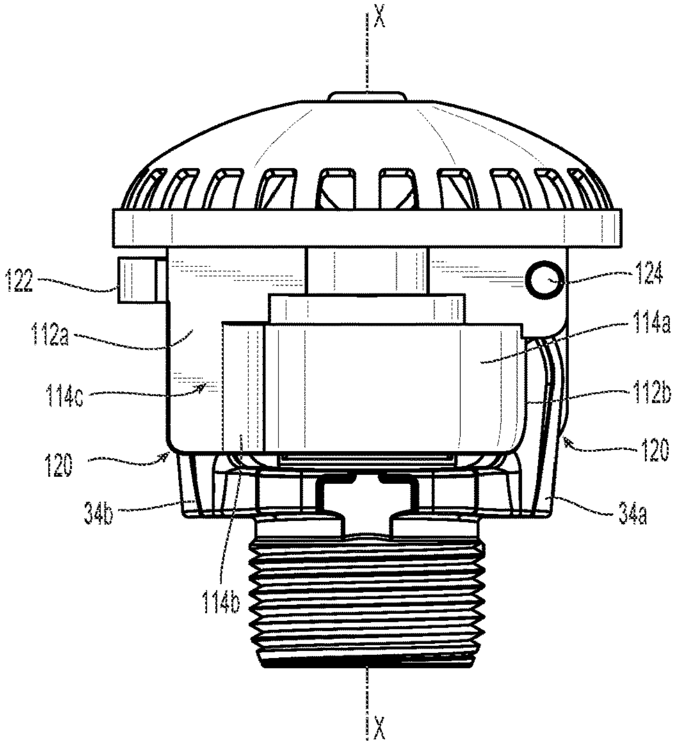
Figure 5C:
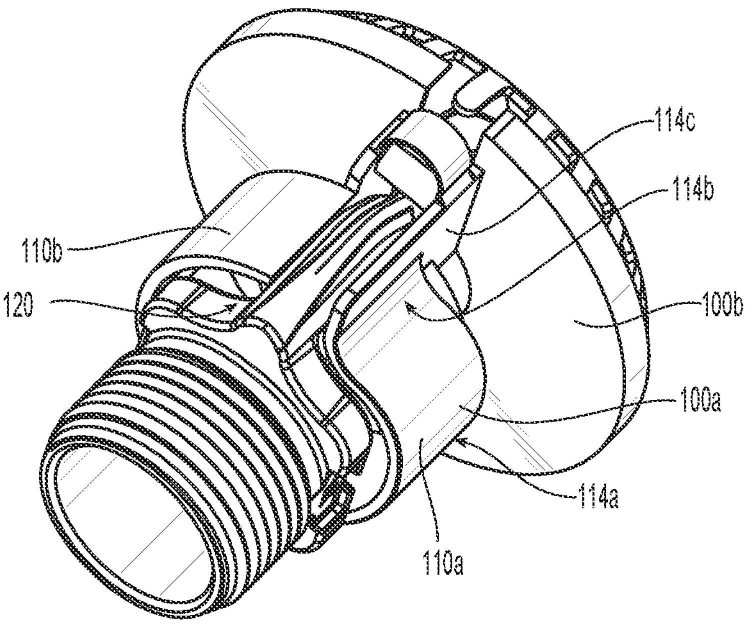
Figure 5D:
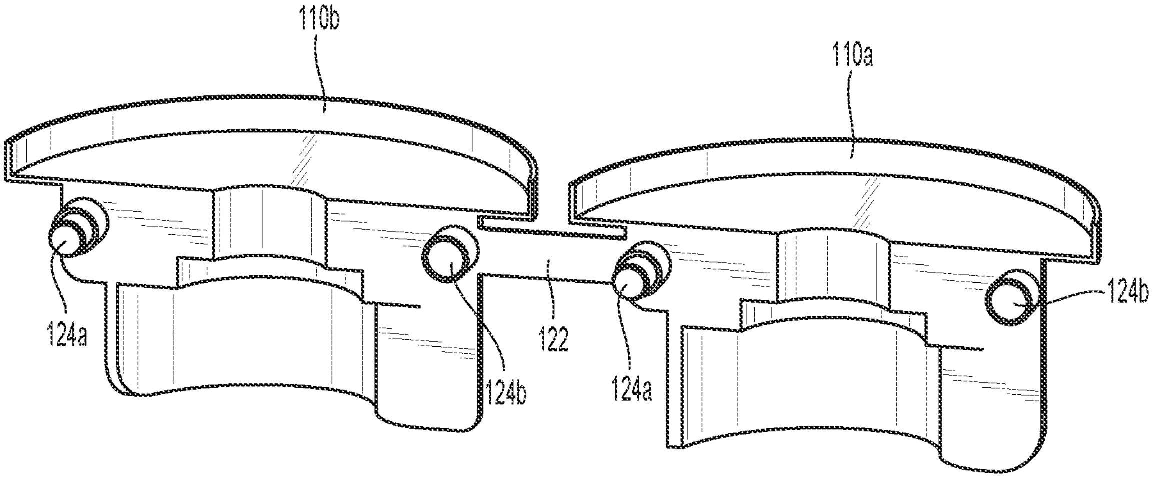
FIG. 5D is a perspective view of another preferred embodiment of a protective device used in the assembly of FIG. 5A shown in an open configuration.

Illustrated in FIG. 4 is the protected sprinkler assembly 10 being installed into the branch connector by hand. The preferred protective device 100 peripherally protects operative components of the sprinkler 20 including the trigger and the fluid deflection member. The external surface of the torque assist portion 120 provides a finger rest and more preferably a thumb rest against which the installer can exert a force to torque the sprinkler 20 into the branch connector 200. With a thumb exerted against one device member 110*a*, the remaining fingers can curl about the other device member 110*b*. Accordingly, the device 100 can protect the operator's hand from the surface edges of the sprinkler 20. The torque assist portion(s) 120 is preferably configured to confront the frame arm(s) 34*a*, 34*b* to transfer the torque that is applied to the protective device to the sprinkler 20. As shown in FIG. 2C, the torque assist portion 120 confronts the frame arm 34*a* with the preferred planar segment 114*c*. Alternatively, the internal surface of the confronting segment 114*c* can define any geometric profile provided it transfers a force to the frame arms 34*a* sufficient to torque the sprinkler 20 about its central axis X-X within the branch connector 200 to form a fluid tight sealed connection.

Where applicable, common reference numbers will be used between different embodiments for similar parts. The protected sprinkler 20 in the assembly 10 of FIG. 1B is shown as a pendent sprinkle with a generally flat planar fluid deflection member. Shown in FIGS. 5A-5C is an alternate embodiment of the protected sprinkler assembly 10' with an illustrative embodiment of an upright sprinkler 20' and an alternate embodiment of a protective device 100'. As an upright sprinkler 20', the fluid deflection member 40' is substantially a domed-shaped member with its spaced apart tines peripherally surrounded by the second portion 100*b* of the protective device 100'. Like the previously described device, the protective device 100' is strapped about the sprinkler frame 30 with two members 110*a*, 110*b* connected to one another by hinge portion 122 to provide internal surfaces for confronting the frame arms 34*a*, 34*b* of the frame 30. Moreover, each of the members 110*a*, 110*b* has laterally opposed end portions 112*a*, 112*b* to define preferred external torque assist portions 120 to facilitate installation of the protected sprinkler into a branch connector. With reference to FIG. 5D showing the protective device 100' in an open configuration, the device includes internal spacers 124 to space the members 110*a*, 110*b* about a plane (not shown). Moreover, one or more of the spacers 124 are configured as a cooperating latching arrangement.

Referring again to FIGS. 1A and 1B, preferred embodiments of the protected sprinkler assembly are configured for hand installation into the branch connector 200 in a fluid tight connection. The branch connector 200 shown is generally a tubular member having a first inlet end 212 for connection to the pipe header 300 and a second outlet end 214 for a preferred threaded connection to the fluid distribution device 20. Depending upon the configuration of the fluid deflection member 40 of the sprinkler 20, the branch connector 200 can be arranged on the header 300 for appropriate installation as pendent, an upright or a sidewall/horizontal device. The branch connector 200 can be configured as a straight fitting or alternatively can be formed as a different type of fitting, such as for example, an elbow fitting or tee fitting to connect an appropriately configured sprinkler. Preferred embodiments of the branch connector 200 include an internal annular seal member for formation of a fluid tight sealed connection with the protected sprinkler assembly 20. The branch connector 200 includes a preferred internally formed gasket chamber 230 in which an annular seal member 400 is disposed. Under load, the preferred geometry of gasket chamber 230 in combination with the preferred geometry of the seal member 400 provides for radial outward deformation of the seal member 400 minimizing or eliminating interference with the flow of water through the annular seal member 400 to the sprinkler 20. The annular seal member 400 is preferably configured as the seal shown in U.S. Pat. No. 10,744,527 to provide a preferred leak-proof connection between a fire protection sprinkler or other fire protection device 200 and the branch connector 200. The material employed for seal member 400 is an EPDM material having a durometer hardness of from 65 to 80, and preferably 70, to provide the desired sealing function and maintain sprinkler position. Firefighting fluid fed into the inlet end 212 flows through the annular seal member out the outlet end 214 to supply the sprinkler 20 for discharge and distribution in accordance with the performance specification of the sprinkler 20.

The connector 200 includes an internally threaded portion 220 proximate the outlet end 214 for coupling preferred embodiments of the protected fire protection sprinkler assembly 10 and more preferably coupling the protected sprinkler assembly 10 by hand torque using preferred embodiments of the protective device 100 described herein. The outlet end 214 and internally threaded portion 220 is preferably configured for connection with a device 200 of a nominal size. Accordingly, preferred embodiments of the branch connector 200 at the outlet end 214 define a nominal size or diameter ranging from ½ inch to 1½ inch and more particularly any one of ½ inch, ¾ inch, 1 inch, 1¼ inch or 1½ inch. The outlet end 214 is preferably defined by a circular planar surface circumscribed and disposed orthogonally with respect to the central longitudinal axis X-X.

Generally, the external thread of the body 32 of the protected fire protection sprinkler 20 is of a tapered form, for example, NPT thread. The internal threaded portion 220 preferably includes an internal straight thread 22 for receipt of the tapered sprinkler thread of the sprinkler 20. The threaded engagement remains sealed from fluid supplied through the inlet end 12 by the proper fluid tight seal sealed engagements between the seal member 400 and the backstop surface 40 and between the sprinkler 20 and the annular seal member 400. The internal diameter ID of the internal straight thread 22 can be defined by any one of the pitch diameter, minor diameter or major diameter of the internal thread 22 provided the straight thread engages the tapered thread of the sprinkler 20. The internal straight thread can be for example, a 1-11.5 NPSH Thread; a ¾-14 NPSH Thread; or ½-14 NPS Thread for mating with a correspondingly nominal 1 inch, ¾ inch or ½ inch fire protection sprinkler.

Use of the preferred straight internal thread permits preferred embodiments of the protected sprinkler assembly 10, 10' to be rotatable about the axis X-X within the branch connector 200, preferably by hand, in any desired position while forming a proper fluid tight seal. More preferably, the internal thread portion 220 and the seal member 400 form a proper fluid tight seal engagement with the sprinkler 20 upon sufficient hand torque using preferred embodiments of the protective device 100, 100'. Threaded installation of the sprinkler 20 deforms the annular seal member 400 and provide a leak-proof fluid-tight seal between the sprinkler 20 and the branch connector 200. The connection between the branch connector 200 and the sprinkler 20 is sufficient to provide a fluid tight seal under a fluid pressure of up to 200 psi or more, for example, pressures of up to and including at least 175 psi.

The discharge or flow characteristics from the sprinkler body 32 is defined by the internal geometry of the sprinkler including its internal passageway, inlet and outlet (the orifice). Generally, the size of the sprinkler discharge orifice is defined by the nominal K-factor of a sprinkler. For a given sprinkler assembly, the larger the K-factor, the larger the discharge orifice, and the smaller the K-factor, the smaller the discharge orifice. Nominal K-factors for sprinklers listed in the National Fire Protection Association Standard Publication, *NFPA* 13*: Standard for the Installation of Sprinkler Systems*, can range from 1 to 30 [GPM/(psi.)$^{1/2}$] and greater. NFPA 13 identifies the following nominal K-factors of 14 or greater: 14[GPM/(psi.)$^{1/2}$] ("K14"); 16.8[GPM/(psi.)$^{1/2}$] ("K16.8"); 19.6[GPM/(psi.)$^{1/2}$] ("K19.6"); 22.4[GPM/(psi.)$^{1/2}$] ("K22.4"); 25.2[GPM/(psi.)$^{1/2}$] ("K25.2") and 28.0 [GPM/(psi.)$^{1/2}$] ("K28"). Even larger nominal K-factors are also possible. As is known in the art, the K-factor of a sprinkler is defined as $K=Q/P^{1/2}$, where Q represents the flow rate (in gallons/min GPM) of water from the outlet of the internal passage through the sprinkler body and P represents the pressure (in pounds per square inch (psi.)) of water or firefighting fluid fed into the inlet end of the internal passageway through the sprinkler body. Accordingly, the designed performance of a sprinkler is a function of the supply of a minimum fluid pressure or flow.

The length L of the branch connector 200 is preferably defined between the outlet end 214 and a mid-point of the concave portion of the saddle-shaped inlet 212. The overall length L of the branch connector between the inlet end 212 and the outlet end 214 preferably ranges from 1 inch to 1½ inch. Moreover, the overall length L of the branch connector 200 preferably corresponds or varies with the outlet nominal diameter size. For example, for a nominal outlet diameter of 1 inch, the length L is preferably 1¼ inch, where the nominal outlet diameter is ¾ inch, the length L is preferably 1⅛ inch and where the nominal outlet diameter is ½ inch, the length L is preferably 1 1/16 inch. The preferred sprinkler assembly 10 could be used with other known branch connectors shown and described, for example, in each of U.S. Pat. Nos. 8,297,663 and 10,744,527 and U.S. Patent Publication No. 2019/0175968.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A protected fire protection sprinkler assembly comprising:

a fire protection sprinkler including a body having an inlet, an outlet, an internal passageway extending between the inlet and the outlet along a central sprinkler axis, and an external thread formed about the central sprinkler axis, the fire protection sprinkler including a pair of spaced apart frame arms disposed in a plane and extending axially from the body and converging toward one another to form an apex centered along the central sprinkler axis and spaced axially from the outlet, the fire sprinkler including a thermally responsive trigger assembly centered along the central sprinkler axis and a fluid deflection member affixed to the apex and centered along the central sprinkler axis with the apex between the thermally responsive trigger assembly and the fluid deflection member; and a protective device disposed about the fire protection sprinkler, the protective device including:

a first protective member and a second protective member opposed one another about the plane to at least partially surround the thermally responsive trigger assembly, at least one of the first and second protective members including, with respect to the thermally responsive trigger, a concave segment and a convex segment contiguous with one another and extending between the frame arms, an inflection transition between the concave segment and the convex segment to define an external torque assist portion of the protective device, wherein the external torque assist portion comprises a wall with a constant wall thickness, the wall having an outer surface including the convex segment disposed between the concave segment and a planar segment.

2. The assembly of claim 1, wherein the at least one of the first protective member and second protective member includes the planar segment extending parallel to the plane and confronting one frame arm.

3. The assembly of claim 2, wherein the concave segment defines a variable radius about the central sprinkler axis.

4. The assembly of claim 2, wherein each of the first and second protective members includes the concave segment, the convex segment, and the planar segment, the planar segment confronting different arms.

5. The assembly of claim 4, wherein the first and second protective members are connected to one another by a hinge.

6. The assembly of claim 1, wherein concave and convex segments define a first protection portion of the device, each of the first and second protective members including a second protection portion located axially from the concave and convex segments, the second protection portion of the fluid deflection member having a shielding surface perpendicular to the central axis and a peripheral shielding surface for at least partially circumscribing the fluid deflection member.

7. The assembly of claim 6, wherein the concave segment defines a first maximum radius about the central sprinkler axis, the second protection portion defining a second maximum radius about the central sprinkler axis, the second maximum radius being greater than the first maximum radius.

8. The assembly of claim 1, wherein the external torque assist portion is located axially between the outlet and the fluid deflection member.

9. The assembly of claim 8, wherein the external torque assist portion is located axially between the outlet and the apex.

10. The assembly of claim 9, wherein the external torque assist portion is located axially closer to the outlet than to the apex.

11. The assembly of claim 1, wherein the protective device includes a pair of spacers between the first and second members from one another about the plane, the pair of spacers being radially disposed about the apex.

12. The assembly of claim 11, wherein at least one of the pair of spacers forms a latched connection between the first and second member.

13. A protective installation device for a fire protection sprinkler having a frame with a body and a pair of spaced apart frame arms extending from and disposed about the body in a plane, a fluid deflection member coupled to the frame arms and spaced from the body with a thermally responsive trigger assembly disposed between the body and the fluid deflection member, the device comprising:

a first member and a second member opposed and connected to one another about the plane to define an internal void about a central axis for housing the fire protection sprinkler, the first and second members defining a first width therebetween to form a first portion of the device for protecting the thermally responsive trigger, the first and second members defining a second width therebetween that is greater than the first width to form a second portion of the device for protecting the fluid deflection member; and each of the first and second members having a first lateral end and a second lateral end, at least one of the first member and the second member includes a convex segment, with respect to the internal void, that is formed between the first lateral end and the second lateral end to define an external torque assist portion of the protective device, the external torque assist portion comprises a wall with a constant wall thickness, the wall having an outer surface including the convex segment disposed between a concave segment and a planar segment.

14. The device of claim 13, wherein the at least one of the first and second members includes a concave segment, with respect to the thermally responsive trigger, that is formed contiguously with the convex segment; and the planar segment extending parallel to the plane.

15. The device of claim 14, wherein the concave segment defines a variable radius about the central axis.

16. The device of claim 14, wherein each of the first and second members includes the concave segment, the convex segment, and the planar segment, the protective device being asymmetrical about the plane.

17. The device of claim 13, wherein the first and second members are connected to one another by a hinge at a pair of lateral ends opposed about the plane.

18. The device of claim 13, wherein the second portion includes a first radially extending surface disposed perpendicular to the central axis and a peripheral surface for at least partially circumscribing the fluid deflection member.

19. The device of claim 18, wherein the second portion comprises a second surface extending parallel to the first surface with the peripheral surface extending between the first and the second surfaces.

20. The device of claim 13, wherein the protective device includes the at least one pair of spacers between the first and second members.

21. The device of claim 20, wherein the at least one pair of spacers forms a latched connection between the first and second members.

* * * * *